United States Patent
Bouis et al.

(10) Patent No.: US 6,741,608 B1
(45) Date of Patent: May 25, 2004

(54) DYNAMICALLY CONFIGURABLE SYSTEM AND METHOD FOR TRANSCODING STREAMING DATA AND TELECOMMUNICATIONS INFRASTRUCTURE THE SAME

(75) Inventors: Jeffrey D. Bouis, Frisco, TX (US); Jeffrey A. Sherer, Richardson, TX (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/239,286

(22) Filed: Jan. 29, 1999

(51) Int. Cl.[7] .............................. H04J 3/16; G06F 15/16
(52) U.S. Cl. ........................................ 370/465; 709/245
(58) Field of Search ................................ 370/465, 466, 370/467, 469, 474, 476, 401, 252, 351–352; 709/238, 201, 220, 221, 222, 225, 227, 228, 241, 246; 380/269, 274, 43, 217; 382/234; 725/115–116, 145–146; 348/14.13, 400.1, 441, 459, 568

(56) References Cited

U.S. PATENT DOCUMENTS

| | | | | |
|---|---|---|---|---|
| 3,902,008 A | * | 8/1975 | Ogawa ......................... | 382/234 |
| 4,344,134 A | * | 8/1982 | Barnes ......................... | 364/200 |
| 5,513,323 A | * | 4/1996 | Williams et al. ............. | 709/241 |
| 5,724,355 A | * | 3/1998 | Bruno et al. ................. | 370/466 |
| 5,758,256 A | * | 5/1998 | Berry et al. .................. | 370/466 |
| 5,991,403 A | * | 11/1999 | Aucsmith et al. ............ | 380/217 |
| 6,046,985 A | * | 4/2000 | Aldred et al. ................ | 370/236 |
| 6,047,002 A | * | 4/2000 | Hartmann et al. ........... | 370/466 |
| 6,049,543 A | * | 4/2000 | Sauer et al. .................. | 370/466 |
| 6,130,917 A | * | 10/2000 | Monroe ....................... | 370/466 |
| 6,144,641 A | * | 11/2000 | Kaplan et al. ................ | 370/252 |
| 6,310,888 B1 | * | 10/2001 | Hamlin ........................ | 370/466 |
| 6,359,902 B1 | * | 3/2002 | Putzolu ....................... | 370/466 |
| 6,421,429 B1 | * | 7/2002 | Merritt et al. ............... | 379/93.17 |

FOREIGN PATENT DOCUMENTS

| | | |
|---|---|---|
| EP | 0 789 470 A2 | 8/1997 |
| WO | WO 93 23817 | 11/1993 |
| WO | WO 97 28628 | 8/1997 |
| WO | WO 98 57521 | 12/1998 |

OTHER PUBLICATIONS

Houghton, T. F., et al.: "A Packet Telephony Gateway For Public Network Operators," ISS Telecommunications Congress, (International Switching Symposium), CA, Toronto, Pinnacle Group, Sep. 21, 1997, pp. 35–44, XP000704453 *the whole document.

Rudkin S., et al.: "Real–Time Applications On The Internet," Apr. 1997, BT Technology Journal, GB, BT Laboratories, vol. 15, Nr. 2, pp. 209–225 XPOOO703571 ISSN: 1358–3948 the whole document.

\* cited by examiner

Primary Examiner—Min Jung
Assistant Examiner—Andy Lee

(57) ABSTRACT

A dynamically configurable system and method for transcoding streaming data and a telecommunications infrastructure incorporating the system or the method. In one embodiment, the system includes: (1) first, second and third streaming conversion modules capable of converting data stream portions between internal data formats and (2) a transcoding controller, associated with the first, second and third streaming conversion modules, that determines source and destination data formats of the data stream and arranges ones of the first, second and third streaming conversion modules in an optimal series to convert portions of the data stream from the source data format through at least one of the internal data formats to the destination data format.

50 Claims, 4 Drawing Sheets

DYNAMICALLY CONFIGURABLE SYSTEM AND METHOD FOR TRANSCODING STREAMING DATA AND TELECOMMUNICATIONS INFRASTRUCTURE THE SAME

TECHNICAL FIELD OF THE INVENTION

The present invention is directed, in general, to data conversion and, more specifically, to a system and method for transcoding streaming data and a telecommunications infrastructure incorporating the system or the method.

BACKGROUND OF THE INVENTION

Almost from their beginning, computer systems were incompatible with each other. The computer systems used different formats to store and communicate data. Users had to develop individual conversion routines to convert the formats used by the other systems into a format that their computer system could process. Soon thereafter, companies developed utility programs that contained a collection of these conversion routines. The utility programs allowed the user to select and execute a single conversion routine from a list of conversion routines.

With the advent of multimedia data processing, the problem of information incompatibility became more prevalent and complex. Instead of only dealing with the incompatibility of computer formats for the same type of information, multimedia environments added incompatibility between multiple types of information. For example, within multimedia environments there may be voice-mail formats, video formats, audio formats, facsimile formats, and computer data formats.

Later-developed conversion programs allowed users to convert from one multimedia format to another multimedia format. However, these conversion programs still required the user to know ahead of time the type of conversion required for each step of the conversion process. If a user wants to convert a voice mail message, the user might start with a speech-to-text conversion program that converts the voice mail message to text. Suppose storage space is critical, then the user would use another program to compress the newly created text file.

Further suppose the user determines that the previously stored message is confidential. The user would then use a program to decompress the file. Then the user would use another program to encrypt the text message. Last but not least, the user would use still another program to compress the encrypted file.

Now the user wants to send the file to another person on a different computer system. This brings a problem on the recipient. The recipient is required to determine which conversion programs to use and in what order. However, the recipient may not have a particular, required conversion routine. The recipient has to determine what conversion programs are available and what type of source formats the programs can convert. Then the recipient is forced to determine what combination of conversion programs can be used to convert from the source format to the desired destination format. Once the recipient has done these steps several times, the recipient has to manually step through each conversion routine until the desired destination format is reached.

Another complexity added to multimedia data conversion was streaming data. Streaming data is the continuous transmission of data over a network. An example of a use of streaming data was the transmission of streaming video and audio over the Internet. However, conversion programs did not convert streaming data as it was received. The conversion programs first collected the data and then converted all the data at once.

What is needed in the art is a way to manage this type of multiple information incompatibility and a better way to perform multimedia conversions.

SUMMARY OF THE INVENTION

To address the above-discussed deficiencies of the prior art, the present invention provides a dynamically configurable system and method for transcoding streaming data and a telecommunications infrastructure incorporating the system or the method. In one embodiment, the system includes: (1) first, second and third streaming conversion modules capable of converting data stream portions between internal data formats and (2) a transcoding controller, associated with the first, second and third streaming conversion modules, that determines source and destination data formats of the data stream and arranges ones of the first, second and third streaming conversion modules in an optimal series to convert portions of the data stream from the source data format through at least one of the internal data formats to the destination data format.

The present invention therefore introduces a dynamically configurable transcoder system wherein a controller selects and arranges conversion modules in a series to provide conversion from a given source data format to a given destination data format. The transcoding controller selects and places the modules into the series in an order that optimizes conversion (according to speed, cost, fidelity, load or by any other desired measure). Thus, if multiple conversion paths are possible, the transcoding controller selects the most optimal path, according to pertinent measurements.

In one embodiment of the present invention, the system further includes a configurable buffer, the transcoding controller further employing the configurable buffer to buffer the portions between the ones of the first, second and third conversion modules in the optimal series. The configurable buffer may be a shared memory space logically between the selected conversion modules. The buffer, while not necessary to the present invention, is advantageous when conversion speeds or units (to be defined) differ between adjacent modules.

In one embodiment of the present invention, the portions are frames of the data stream. In an embodiment to be illustrated and described, the portions may be of any size, from byte to complete stream. The portions may also vary in size.

In one embodiment of the present invention, the portions are less than a conversion unit, each of the first, second and third conversion modules internally buffering the portions to amass a conversion unit. A "conversion unit" is defined as the smallest unit of data that a particular conversion module can convert at a time. Many speech compression algorithms work on 40 ms portions of datastreams. Text-to-speech algorithms typically operate on a syllable or a word at a time. The conversion modules of the present invention therefore may be adapted to accept portions of any length and amass portions internally until they have enough data (a conversion unit's worth) before converting the data.

In one embodiment of the present invention, the first, second and third conversion modules are selected from the group consisting of: (1) data compression modules, (2) data decompression modules, (3) data encryption modules, (4) data decryption modules, (5) data format conversion modules, (6) data media conversion modules and (7) data signal processing modules. Those skilled in the art are aware of the many conventional algorithms for data compression/ decompression and encryption/decryption. The present invention is adapted to operate with any of these or any later developed algorithm. Data format conversion is directed to changing the format of the data, rather than the data itself. Data media conversion involves changing the conveyance of the data, such as text-to-speech conversion or speech recognition.

In one embodiment of the present invention, the transcoding controller arranges ones of the first, second and third streaming conversion modules in at least two optimal series concurrently to convert portions of the data stream from the source data format through at least two of the internal data formats to at least two destination data formats. Thus, a data stream in a given input data format may be concurrently converted into two or more different output data format. Of course, this need not be the case.

In one embodiment of the present invention, the first, second and third conversion modules are embodied in instantiable objects, the transcoding controller instantiating the ones of the first, second and third conversion modules to arrange the ones of the first, second and third streaming conversion modules in the optimal series. In an embodiment to be illustrated and described, the conversion modules and the transcoding controller are sequences of instructions, organized into objects and executable in a general-purpose data processing and storage machine. Of course, the conversion modules may not be object-oriented and need not be embodied in software. They may instead be discrete or integrated digital or analog hardware.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
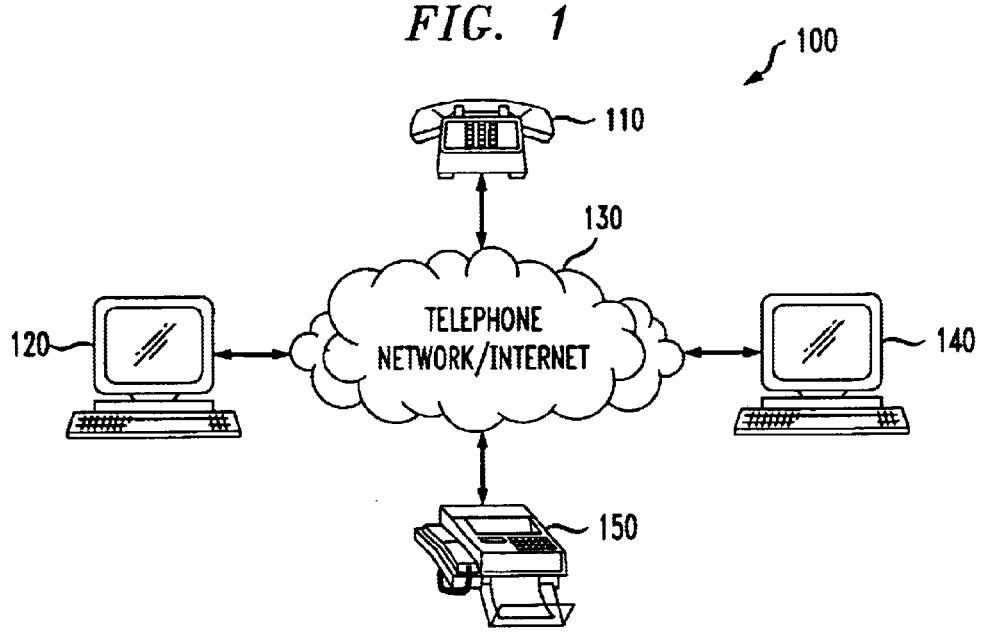
FIG. 1 illustrates a block diagram of a telecommunications infrastructure that can serve as an environment within which a system or a method constructed according to the principles of the present invention may operate.

Referring initially to FIG. 1, illustrated is a block diagram of a telecommunications infrastructure 100 that can serve as an environment within which a system or a method constructed according to the principles of the present invention may operate. In one embodiment of the present invention, the invention comprises a telephone 110, a messaging computer 120, a facsimile machine 150, a telephone network/ Internet 130 and a transcoding computer system 140.

The telephone network/Internet 130 comprises a gateway that couples a public switched telephone network and the Internet. Connected to the telephone network/Internet 130 are the messaging computer 120, the telephone 110, the facsimile machine 150 and the transcoding computer system 140. In the illustrated embodiment of the present invention, the telecommunications infrastructure 100 may comprise any number of telephones 110, messaging computers 120 and facsimile machines 150.

The telephone 110 communicates over the telephone network/Internet 130 and generates voice mail messages used by the transcoding computer system 140. The facsimile machine 150 sends facsimiles over the telephone network/ Internet 130 to the transcoding computer system 140. The messaging computer 120 generates electronic mail ("email") messages, facsimile messages, and voice mail messages. The messaging computer 120 transmits the generated messages over the telephone network/Internet 130 to the transcoding computer system 140.

One skilled in the art should understand that the present invention is not limited to using the telephone network/ Internet 130. In another embodiment of the present invention, the information to be processed is transmitted directly into the transcoding computer system 140. In a third embodiment of the present invention, the information that is processed by the transcoding computer system 140 could be contained within the transcoding computer system 140 itself.

Figure 2:
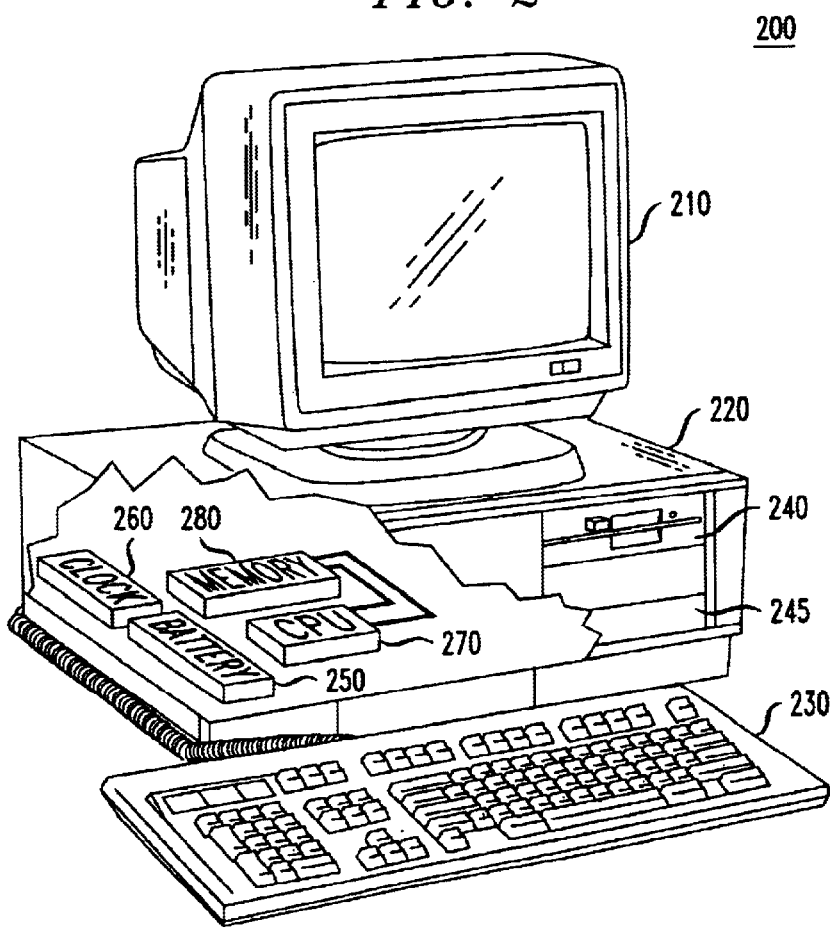
FIG. 2 illustrates a block diagram of a computer system that can serve as an environment within which a system or a method constructed according to the principles of the present invention may operate.

Turning now to FIG. 2, illustrated is an isometric view of a computer system 200 operating as the transcoding computer system 140 of FIG. 1. The computer system 200 may be a conventional personal computer ("PC"). The transcoding computer system 140 need not be embodied in a computer system. Instead, the transcoding computer system 140 may take the form of a wireless terminal or a telephony interface card.

The computer system 200 includes a monitor 210, a chassis 220 and a keyboard 230. Alternatively, the monitor 210 and the keyboard 230 may be replaced by other conventional output and input devices, respectively. The chassis 220 includes both a floppy disk drive 240 and a hard disk drive 245. The floppy disk drive 240 is employed to receive, read and write to external disks; the hard disk drive 245 is employed for fast access storage and retrieval. The floppy disk drive 240 may be replaced by or combined with other conventional structures to receive and transmit data and instructions, including without limitation, tape and compact disc drives, telephony systems and devices (including videophone, paging and facsimile technologies), network interface cards, and serial and parallel ports.

The chassis 220 is illustrated having a cut-away portion that includes a battery 250, a clock 260, a central processing unit ("CPU") 270 and a memory storage device 280. The processing circuitry of the present invention may be embodied in the CPU 270 and the communications circuitry of the present invention may be embodied in the CPU 270 in combination with the memory storage device 280. Although the computer system 200 is illustrated having a single CPU 270, hard disk drive 245 and memory storage device 280, the computer system 200 may be equipped with a plurality of CPUs and peripheral devices.

It should be noted that any conventional computer system having at least one CPU that is suitable to function as a transcoding computer system may be replaced, or be used in conjunction with, the computer system 200, including without limitation, videophones, telephones, televisions, sophisticated calculators, and hand-held, laptop/notebook, mini, mainframe and supercomputers, including RISC and parallel processing architectures, as well as within computer system network combinations. Conventional computer system architecture is more fully discussed in Computer Organization and Architecture, by William Stallings, MacMillan Publishing Co. (3rd ed. 1993) and incorporated herein by reference. Alternative computer system embodiments may be firmware-or hardware-based.

Figure 3:
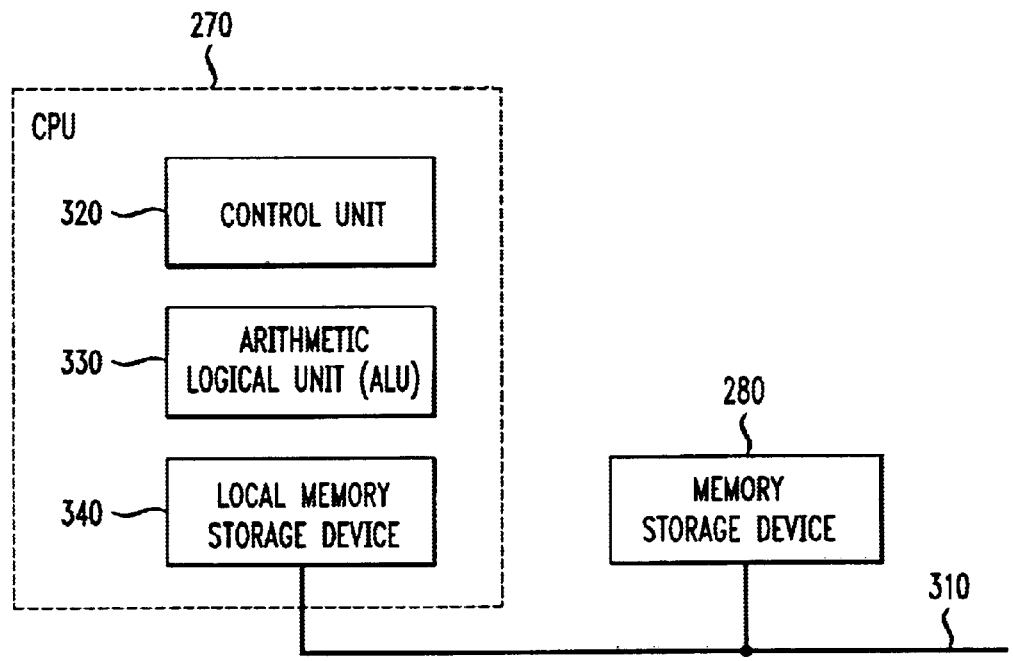
FIG. 3 illustrates a schematic block diagram of the CPU of FIG. 2 incorporating an embodiment of the present invention.

Turning now to FIG. 3, illustrated is a schematic block diagram of the CPU 270 of FIG. 2 incorporating an embodiment of the present invention. The CPU 270 is coupled to the memory storage device 280 by a data bus 310. The memory storage device 280 stores data and instructions that the CPU 270 uses to execute the functions necessary to operate the computer system 200. The memory storage device 280 may be any conventional memory storage device. The CPU 270 includes a control unit 320, an arithmetic logic unit ("ALU") 330 and a local memory storage device 340 (e.g., a stackable cache, a plurality of registers, etc.). The control unit 320 fetches the instructions from the memory storage device 280. The ALU 330, in turn, performs a plurality of operations, including addition and Boolean AND, necessary to carry out the instructions fetched from the memory storage device 280. The local memory storage device 340 provides a local high speed storage location for storing temporary results and control information generated and employed by the ALU 330. Again, the processing circuitry of the present invention is embodied in the CPU 270 and the transcoding circuitry of the present invention may be embodied in the CPU 270 in combination with the memory storage device 280.

Figure 4:
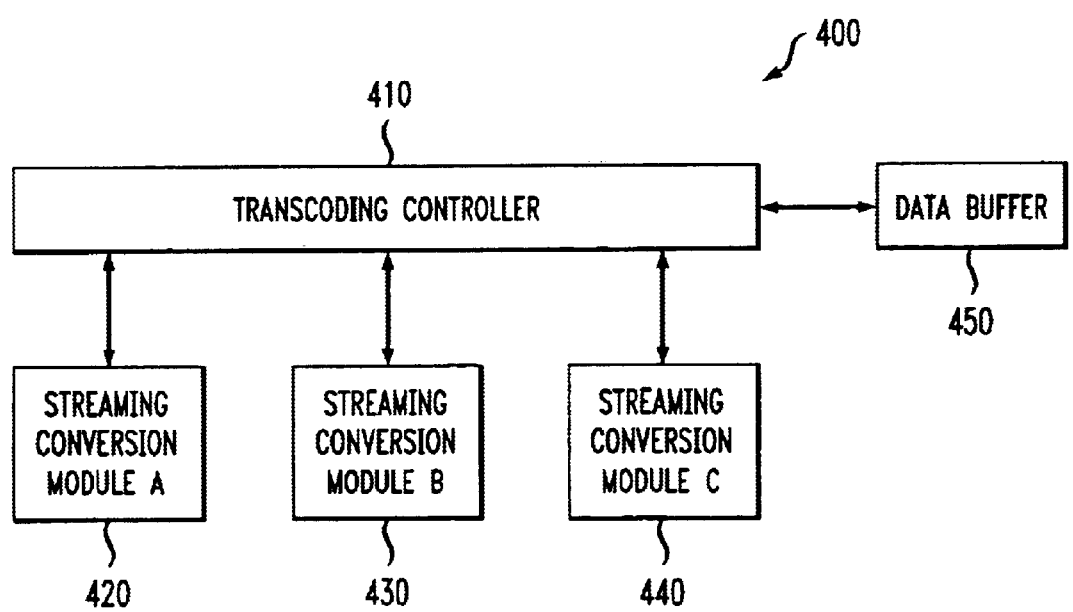
FIG. 4 illustrates a block diagram of one embodiment of a transcoding system constructed according to the principles of the present invention.

Turning now to FIG. 4, illustrated is a block diagram of one embodiment of a transcoding system constructed according to the principles of the present invention. The transcoding system, generally designated 400, comprises a transcoding controller 410, a streaming conversion module A 420, a streaming conversion module B 430, a streaming conversion module C 440 and a configurable data buffer 450. Coupled to the transcoding controller 410 is the streaming conversion module A 420, the streaming conversion module B 430, the streaming conversion module C 440 and the configurable data buffer 450.

In one embodiment of the present invention, the streaming conversion module A 420, the streaming conversion module B 430 and the streaming conversion module C 440 perform at least one of the following: data compression, data decompression, data encryption, data decryption, data format conversion, data media conversion or data signal processing. Each of the streaming conversion modules converts from an input format to an associated internal data format. The transcoding system 400 is capable of combining the streaming conversion modules into a sequence, arranged by internal data formats, to convert from a source data format to a destination data format. Also, each of the streaming conversion modules is capable of buffering the incoming data stream internally in order to accommodate the type of processing the streaming conversion module performs.

The transcoding controller 410 is the central management mechanism of the transcoding system 400. The transcoding controller 410 determines the source and destination formats of a data stream to be converted. In one advantageous embodiment of the present invention, the transcoding controller 410 determines the source format from the data stream. In another embodiment of the present invention, the transcoding controller 410 determines the source and destination formats from parameters passed to the transcoding controller 410.

The transcoding controller 410 also determines a module conversion type for the streaming conversion module A 420, the streaming conversion module B 430 and the streaming conversion module C 440. From these module conversion types, the transcoding controller 410 can determine an optimal arrangement of streaming conversion modules to convert a given source format to a destination format.

The advantage of the transcoding controller 410 is the capability of the transcoding controller 410 to determine the "least cost" path. The "least cost" path is an optimal arrangement of streaming conversion modules that would incur the least estimated processing load on the system when the system 400 performs a conversion. In one embodiment of the present invention, the transcoding controller 410 calculates the "least cost" path by determining the type of conversion accomplished by each of the streaming conversion modules and the amount of system load incurred to complete that conversion. The transcoding controller 410 also determines the combinations ("paths") of streaming conversion modules that can convert from the source format to the destination format. For each of the paths, the transcoding controller 410 determines a path system load by adding each of the streaming conversion modules' system loads together. The transcoding controller 410 compares the path system loads to determine which path will produce the lease amount of load or cost on the system. In another embodiment of the present invention, the transcoding controller 410 is capable of using two optimal series of streaming conversion modules concurrently to convert portions of the data stream from the source format to a destination format.

The configurable data buffer 450 is a storage area used by the transcoding system 400 in the process of converting the data stream from a source format to a destination format. The transcoding controller 410 allocates the size of configurable data buffer 450 based upon the type of conversion to be performed and the number of streaming conversion modules needed for the conversion process. In one embodiment of the present invention, the transcoding controller 410 uses the configurable data buffer 450 to buffer the input data stream to accommodate streaming data (such as streaming video over the Internet). In another embodiment of the present invention, the configurable data buffer 450 is shared memory space accessible by the transcoding controller 410, the streaming conversion module A 420, the streaming conversion module B 430 and the streaming conversion module C 440. In a third embodiment of the present invention, the transcoding system 400 may comprise any number of configurable data buffers 450.

One skilled in the art should know that the transcoding controller 410 is not limited to controlling only 3 streaming conversion modules. In other embodiments of the present invention, the transcoding system 400 and the transcoding controller 410 may contain additional or fewer functions than described.

Figure 5:
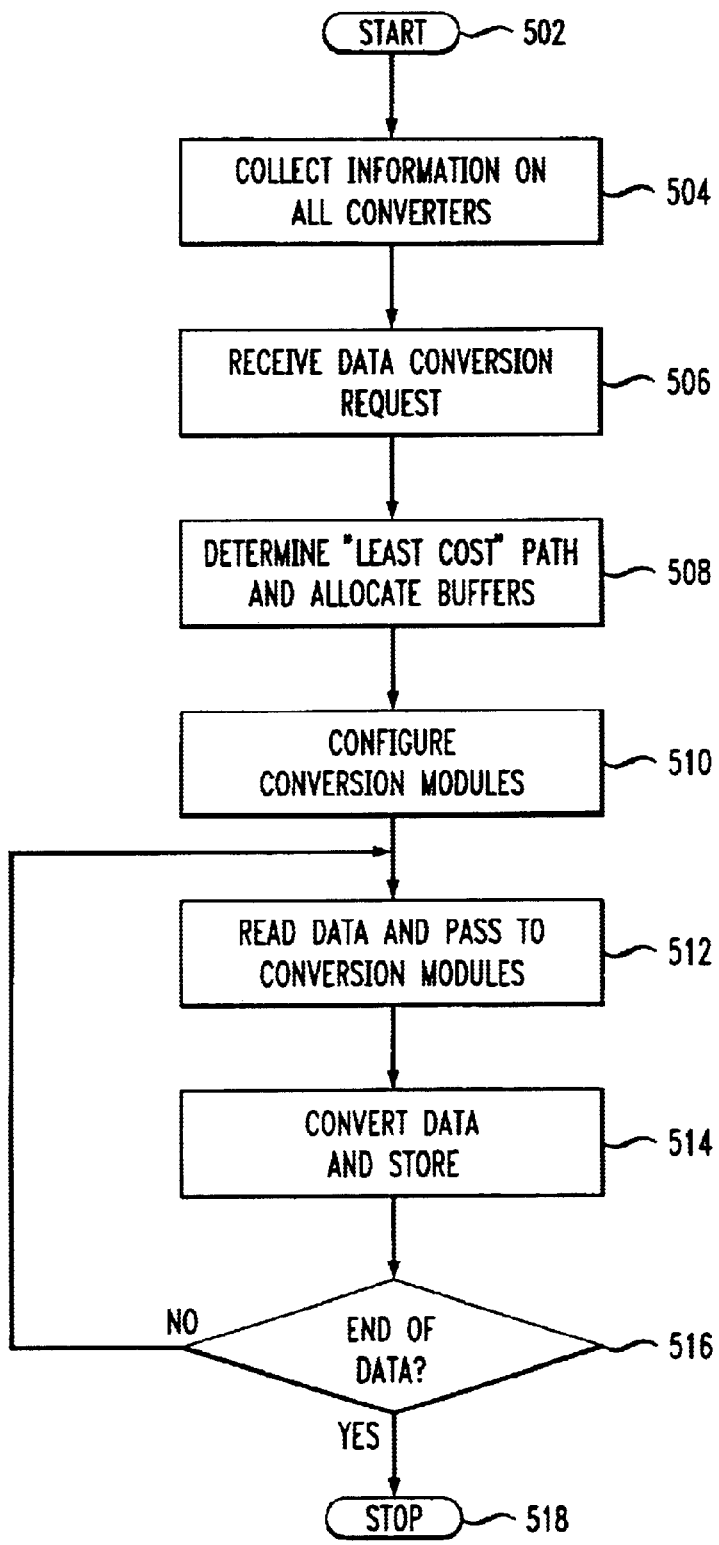
FIG. 5 illustrates a flow diagram for converting a data stream using the transcoding controller of FIG. 4.
Figure 6A:
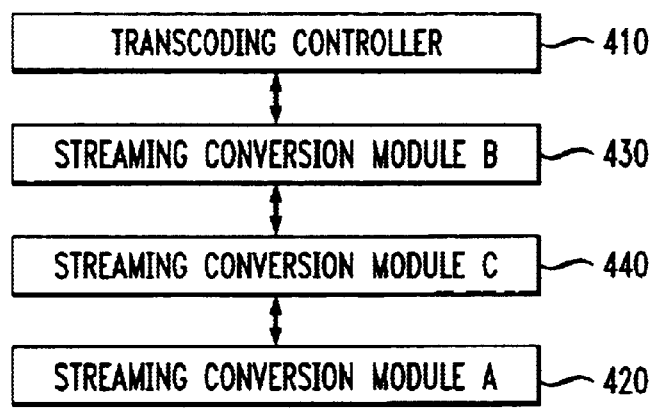
FIG. 6A illustrates a block diagram of an optimal series arrangement of streaming conversion modules constructed according to the principles of the present invention.
Figure 6B:
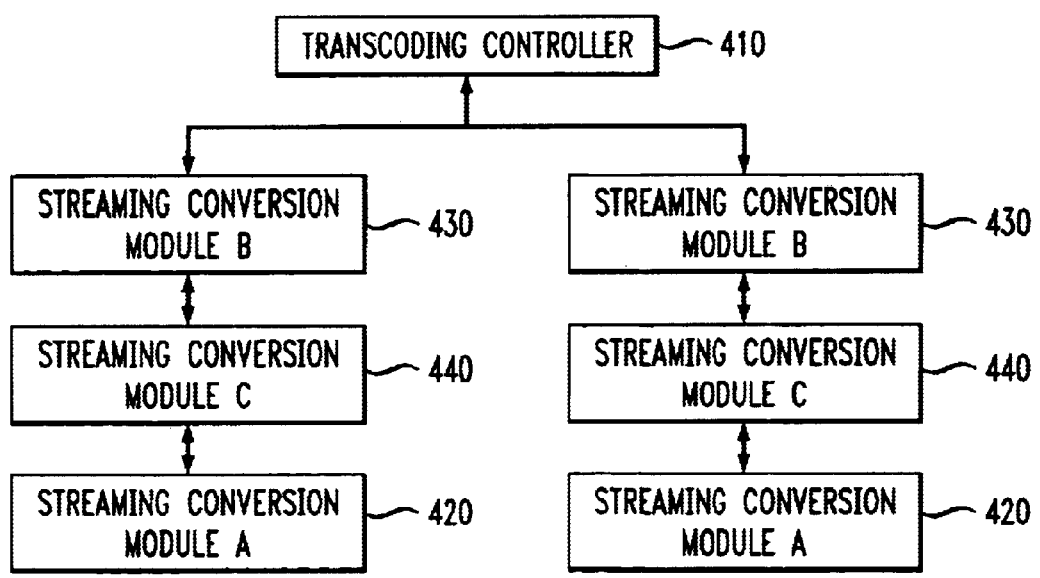
FIG. 6B illustrates a block diagram of a transcoding controller with two optimal series arrangements of streaming conversion modules for concurrent conversion of a data stream constructed according to the principles of the present invention.

Turning now to FIG. 5, illustrated is a flow diagram for converting a data stream using the transcoding controller 410 of FIG. 4. In FIG. 5, the transcoding controller 410 first performs initialization and starts the conversion process in a step 502.

After initialization, the transcoding controller 410 determines what streaming conversion modules are in the transcoding system 400 and collects their associated module information in a step 504. In one embodiment of the present invention, the transcoding controller 410 also performs statical analysis on each of the streaming conversion modules. From the statical analysis, the transcoding controller 410 determines system load characteristics and conversion times for each of the streaming conversion modules.

Next, the transcoding controller 410 receives the data conversion request in a step 506. The transcoding controller 410 then determines a "least cost" path for this data conversion request in a step 508. In the "least cost" path determination, the transcoding controller 410 determines the source and destination format for the data request. The transcoding controller 410 also determines which combination of the streaming conversion modules will produce the least estimated load on the system. The transcoding controller 410 also allocates a storage area for the configurable data buffer 450.

The transcoding controller 410 configures the streaming conversion modules in the optimal sequence in a step 510. This configuration step comprises linking the inputs and outputs of the streaming conversion modules to each other in the correct optimal sequence in order to convert the data stream from the source format to destination format.

Next, the transcoding controller 410 reads the data stream and passes the information to the correct streaming conversion modules in a step 512. The streaming conversion modules convert the information and store the converted information in the appropriate location in a step 514.

Next, the transcoding controller 410 then determines if the transcoding controller 410 is at the end of the data stream in a decisional step 516. If the transcoding controller 410 is not at the end of the data stream, then the transcoding controller 410 reads more data in the step 512. If the transcoding controller 410 is at the end of the data stream, the transcoding controller 410 then stops processing the data conversion request in a step 518.

One skilled in the art should know that the present invention is not limited to using a "least cost" method for configuring streaming conversion modules and that, even if a "least cost" method is employed, that "cost" can be defined in many different ways. In another embodiment of the present invention, the transcoding controller 410 may use other algorithms to optimally configure the order and use of the streaming conversion modules. Other embodiments of the present invention may have additional or fewer steps than described above.

From the above, it is apparent that the present invention provides a dynamically configurable system and method for transcoding streaming data and a telecommunications infrastructure incorporating the system or the method. In one embodiment, the system includes: (1) first, second and third streaming conversion modules capable of converting data stream portions between internal data formats and (2) a transcoding controller, associated with the first, second and third streaming conversion modules, that determines source and destination data formats of the data stream and arranges ones of the first, second and third streaming conversion modules in an optimal series to convert portions of the data stream from the source data format through at least one of the internal data formats to the destination data format.

Although the present invention has been described in detail, those skilled in the art should understand that they can make various changes, substitutions and alterations herein without departing from the spirit and scope of the invention in its broadest form.

What is claimed is:

1. A system for transcoding a data stream, comprising:

first, second and third streaming conversion modules capable of converting data stream portions between internal data formats;

a transcoding controller, associated with said first, second and third streaming conversion modules, that determines source and destination data formats of said data stream and arranges ones of said first, second and third streaming conversion modules in an optimal series to convert portions of said data stream from said source data format through at least one of said internal data formats to said destination data format, wherein said optimal series is based on an arrangement of said ones of said first, second and third streaming conversion modules that would incur a least estimated processing load; and a configurable buffer, said transcoding controller further employing said configurable buffer to buffer said portions between said ones of said first, second and third conversion modules in said optimal series.

2. The system as recited in claim 1 wherein said portions are frames of said data stream.

3. The system as recited in claim 1 wherein said portions are less than a conversion unit, each of said first, second and third conversion modules internally buffering said portions to amass a conversion unit.

4. The system as recited in claim 1 wherein said first, second and third conversion modules are selected from the group consisting of:

data compression modules, data decompression modules, data encryption modules, data decryption modules, data format conversion modules, data media conversion modules, and data signal processing modules.

5. The system as recited in claim 1 wherein said first, second and third conversion modules are embodied in instantiable objects, said transcoding controller instantiating said ones of said first, second and third conversion modules to arrange said ones of said first, second and third streaming conversion modules in said optimal series.

6. The system as recited in claim 1 wherein said arranges includes permuting ones of said first, second and third streaming conversion modules into said optimal series to convert said portions of said data stream from said source data format through said at least one of said internal data formats to said destination data format.

7. A method of transcoding a data stream, comprising:
   determining source and destination data formats of said data stream;
   arranging ones of first, second and third streaming conversion modules capable of converting data stream portions between internal data formats in an optimal series to allow portions of said data stream to be converted from said source data format through at least one of said internal data formats to said destination data format, wherein said optimal series is based on an arrangement of said ones of said first, second and third streaming conversion modules that would incur a least estimated processing load; and
   buffering said portions between said ones of said first, second and third conversion modules in said optimal series employing a configurable buffer.

8. The method as recited in claim 7 wherein said portions are frames of said data stream.

9. The method as recited in claim 7 wherein said portions are less than a conversion unit, said method further comprising buffering said portions internally within each of said first, second and third conversion modules to amass a conversion unit.

10. The method as recited in claim 7 wherein said first, second and third conversion modules are selected from the group consisting of:
   data compression modules,
   data decompression modules,
   data encryption modules,
   data decryption modules,
   data format conversion modules,
   data media conversion modules, and
   data signal processing modules.

11. Method as recited in claim 7 wherein said first, second and third conversion modules are embodied in instantiable objects, said arranging comprising instantiating said ones of said first, second and third conversion modules.

12. The method as recited in claim 7 wherein said arranging includes permuting ones of said first, second and third streaming conversion modules into said optimal series to allow said portions of said data stream to be converted from said source data format through said at least one of said internal data formats to said destination data format.

13. A telecommunications infrastructure, comprising:
   a data network;
   a telephone network;
   a gateway coupling said data network and said telephone network; and
   a system, associated with said gateway, for transcoding a data stream communicated in at least one of said data network and said telephone network, including:
      first, second and third streaming conversion modules capable of converting data stream portions between internal data formats,
      a transcoding controller, associated with said first, second and third streaming conversion modules, that determines source and destination data formats of said data stream and arranges ones of said first, second and third streaming conversion modules in an optimal series to convert portions of said data stream from said source data format through at least one of said internal data formats to said destination data format, wherein said optimal series is based on an arrangement of said ones of said first, second and third streaming conversion modules that would incur a least estimated processing load; and
      a configurable buffer, said transcoding controller further employing said configurable buffer to buffer said portions between said ones of said first, second and third conversion modules in said optimal series.

14. Infrastructure as recited in claim 13 wherein said portions are frames of said data stream.

15. Infrastructure as recited in claim 13 wherein said portions are less than a conversion unit, each of said first, second and third conversion modules internally buffering said portions to amass a conversion unit.

16. Infrastructure as recited in claim 13 wherein said first, second and third conversion modules are selected from the group consisting of:
   data compression modules,
   data decompression modules,
   data encryption modules,
   data decryption modules,
   data format conversion modules,
   data media conversion modules, and
   data signal processing modules.

17. Infrastructure as recited in claim 13 wherein said first, second and third conversion modules are embodied in instantiable objects, said transcoding controller instantiating said ones of said first, second and third conversion modules to arrange said ones of said first, second and third streaming conversion modules in said optimal series.

18. The infrastructure as recited in claim 13 wherein said arranges includes permuting said ones of said first, second and third streaming conversion modules into said optimal series to convert portions of said data stream from said source data format through said at least one of said internal data formats to said destination data format.

19. A system for transcoding data streams, comprising:
   a first plurality of different streaming conversion modules capable of converting data stream portions between internal data formats; and
   a transcoding controller, associated with said first plurality of the streaming conversion modules, that effects any desired conversion of a plurality of data stream conversions, by determining a source data format of a data stream that is desired to be converted and a desired destination data format of a converted said data stream, selecting a second plurality of the streaming conversion modules that are included in the first plurality as a function of the desired conversion, and arranging the second plurality of the streaming conversion modules in an ordered series that is a function of the desired conversion such that processing of portions of said data stream that is desired to be converted through said series converts said portions of said data stream from said source data format through at least one of said internal data formats to said desired destination data format, wherein each of said first plurality of said streaming conversion modules are configured to internally buffer said portions to amass a conversion unit.

20. The system as recited in claim 19 further comprising a configurable buffer, said transcoding controller further employing said configurable buffer to buffer said portions between said second plurality of the streaming conversion modules.

21. The system as recited in claim 19 wherein said portions are frames of said data stream.

22. The system as recited in claim 19 wherein said portions are less than said conversion unit.

23. The system as recited in claim 19 wherein said first plurality of the streaming conversion modules are selected from the group consisting of:

data compression modules,
data decompression modules,
data encryption modules,
data decryption modules,
data format conversion modules,
data media conversion modules, and
data signal processing modules.

24. The system as recited in claim 19 wherein said transcoding controller arranges ones of said second plurality of the streaming conversion modules in at least two optimal series concurrently to convert portions of said data stream from said source data format through at least two of said internal data formats to at least two destination data formats.

25. The system as recited in claim 19 wherein said first plurality of the streaming conversion modules are embodied in instantiable objects, said transcoding controller instantiating said second plurality of the streaming conversion modules to arrange said second plurality of the streaming conversion modules in an optimal series.

26. A method of transcoding a data stream, comprising:
    determining which transcoding, of a plurality of transcodings that can be performed on the data stream by a first plurality of different streaming conversion modules capable of converting portions of the data stream between internal data formats, is to be performed on the data stream, including
       determining, by a transcoding controller associated with said first plurality of the streaming conversion modules, a source format and a desired destination format of the data stream;
    selecting by the transcoding controller a second plurality of the streaming conversion modules that are included in the first plurality to perform the transcoding;
    ordering by the transcoding controller the selected second plurality of the streaming conversion modules in a series to perform the transcoding;
    performing the transcoding by processing the portions of the data stream by the series of the selected second plurality of the streaming conversion modules from the source data format through at least one of the internal data formats to the desired destination data format; and
    buffering said portions internally within each of said second plurality of the streaming conversion modules to amass a conversion unit.

27. The method as recited in claim 26 wherein said performing the transcoding includes buffering the portions of the data stream between said second plurality of the streaming conversion modules.

28. The method as recited in claim 26 wherein the portions are frames of said data stream.

29. The method as recited in claim 26 wherein said portions are less than said conversion unit.

30. The method as recited in claim 26 wherein said first plurality of streaming conversion modules are selected from the group consisting of:
    data compression modules,
    data decompression modules,
    data encryption modules,
    data decryption modules,
    data format conversion modules,
    data media conversion modules, and
    data signal processing modules.

31. The method as recited in claim 26 wherein said ordering comprises ordering the selected second plurality of the streaming conversion modules in at least two optimal series concurrently to allow portions of said data stream to be transcoded from said source data format through at least two of said internal data formats to at least two destination data formats.

32. The method as recited in claim 26 wherein said first plurality of the streaming conversion modules are embodied in instantiable objects, said ordering comprising instantiating said selected second plurality of the conversion modules.

33. A system for transcoding a data stream, comprising:
    first, second and third streaming conversion modules capable of converting data stream portions between internal data formats; and
    a transcoding controller, associated with said first, second and third streaming conversion modules, that determines source and destination data formats of said data stream and arranges ones of said first, second and third streaming conversion modules in at least two optimal series concurrently to convert portions of said data stream from said source data format through at least two of said internal data formats to at least two destination data formats.

34. The system as recited in claim 33 further comprising a configurable buffer, said transcoding controller further employing said configurable buffer to buffer said portions between said ones of said first, second and third conversion modules in said optimal series.

35. The system as recited in claim 33 wherein said portions are frames of said data stream.

36. The system as recited in claim 33 wherein said portions are less than a conversion unit, each of said first, second and third conversion modules internally buffering said portions to amass a conversion unit.

37. The system as recited in claim 33 wherein said first, second and third conversion modules are selected from the group consisting of:
    data compression modules,
    data decompression modules,
    data encryption modules,
    data decryption modules,
    data format conversion modules,
    data media conversion modules, and
    data signal processing modules.

38. The system as recited in claim 33 wherein said first, second and third conversion modules are embodied in instantiable objects, said transcoding controller instantiating said ones of said first, second and third conversion modules to arrange said ones of said first, second and third streaming conversion modules in said optimal series.

39. A method of transcoding a data stream, comprising:
    determining source and destination data formats of said data stream; and
    arranging ones of first, second and third streaming conversion modules capable of converting data stream portions between internal data formats in at least two optimal series concurrently to allow portions of said data stream to be converted from said source data format through at least two of said internal data formats to at least two destination data formats.

40. The method as recited in claim 39 further comprising buffering said portions between said ones of said first, second and third conversion modules in said optimal series.

41. The method as recited in claim 39 wherein said portions are frames of said data stream.

42. The method as recited in claim 39 wherein said portions are less than a conversion unit, said method further comprising buffering said portions internally within each of said first, second and third conversion modules to amass a conversion unit.

43. The method as recited in claim 39 wherein said first, second and third conversion modules are selected from the group consisting of:
- data compression modules,
- data decompression modules,
- data encryption modules,
- data decryption modules,
- data format conversion modules,
- data media conversion modules, and
- data signal processing modules.

44. The method as recited in claim 39 wherein said first, second and third conversion modules are embodied in instantiable objects, said arranging comprising instantiating said ones of said first, second and third conversion modules.

45. A telecommunications infrastructure, comprising:
- a data network;
- a telephone network;
- a gateway coupling said data network and said telephone network; and
- a system, associated with said gateway, for transcoding a data stream communicated in at least one of said data network and said telephone network, including:
  - first, second and third streaming conversion modules capable of converting data stream portions between internal data formats, and
  - a transcoding controller, associated with said first, second and third streaming conversion modules, that determines source and destination data formats of said data stream and arranges ones of said first, second and third streaming conversion modules in at least two optimal series concurrently to convert portions of said data stream from said source data format through at least two of said internal data formats to at least two destination data formats.

46. The infrastructure as recited in claim 45 wherein said system further includes a configurable buffer, said transcoding controller further employing said configurable buffer to buffer said portions between said ones of said first, second and third conversion modules in said optimal series.

47. The infrastructure as recited in claim 45 wherein said portions are frames of said data stream.

48. The infrastructure as recited in claim 45 wherein said portions are less than a conversion unit, each of said first, second and third conversion modules internally buffering said portions to amass a conversion unit.

49. The infrastructure as recited in claim 45 wherein said first, second and third conversion modules are selected from the group consisting of:
- data compression modules,
- data decompression modules,
- data encryption modules,
- data decryption modules,
- data format conversion modules,
- data media conversion modules, and
- data signal processing modules.

50. The infrastructure as recited in claim 45 wherein said first, second and third conversion modules are embodied in instantiable objects, said transcoding controller instantiating said ones of said first, second and third conversion modules to arrange said ones of said first, second and third streaming conversion modules in said optimal series.

* * * * *